(12) United States Patent
Dequina (10) Patent No.: US 7,868,597 B2
(45) Date of Patent: Jan. 11, 2011

(54) DEAD-TIME TRANSITION ADJUSTMENTS FOR SYNCHRONOUS POWER CONVERTERS

(75) Inventor: Noel B. Dequina, Flemington, NJ (US)

(73) Assignee: Intersil Americas Inc., Milpitas, CA (US)

( * ) Notice: Subject to any disclaimer, the term of this patent is extended or adjusted under 35 U.S.C. 154(b) by 280 days.

(21) Appl. No.: 12/176,762

(22) Filed: Jul. 21, 2008

(65) Prior Publication Data
US 2009/0027021 A1 Jan. 29, 2009

Related U.S. Application Data

(60) Provisional application No. 60/951,259, filed on Jul. 23, 2007.

(51) Int. Cl.
*G05F 1/652* (2006.01)
*G05F 1/613* (2006.01)

(52) U.S. Cl. .................. 323/222; 323/282; 323/284; 323/285

(58) Field of Classification Search ................ 323/222, 323/282, 284, 285
See application file for complete search history.

(56) References Cited

U.S. PATENT DOCUMENTS

| | | |
|---|---|---|
| 4,298,835 A | 11/1981 | Rowe |
| 4,541,041 A | 9/1985 | Park et al. |
| 4,731,574 A | 3/1988 | Melbert |
| 4,809,150 A | 2/1989 | Limuti et al. |
| 4,814,684 A | 3/1989 | McCurdy |
| 5,982,160 A | 11/1999 | Walters et al. |
| 5,994,885 A | 11/1999 | Wilcox et al. |
| 6,058,037 A | 5/2000 | Shibata et al. |
| 6,246,220 B1 | 6/2001 | Isham et al. |
| 6,396,250 B1 | 5/2002 | Bridge |
| 6,643,145 B1 | 11/2003 | Harrison |
| 6,812,677 B2 | 11/2004 | Walters et al. |
| 6,815,936 B2 | 11/2004 | Wiktor et al. |
| 6,861,826 B2 | 3/2005 | Lynch |
| 6,933,706 B2 | 8/2005 | Shih |

(Continued)

OTHER PUBLICATIONS

Baliga et al., "Paradigm Shift in Planar Power MOSFET Technology", "Power Electronic Technology", Nov. 2003, pp. 24-32, Publisher: Penton Media Inc.

(Continued)

*Primary Examiner*—Bao Q Vu
(74) *Attorney, Agent, or Firm*—Fogg & Powers LLC (57) ABSTRACT

A method of operating a synchronous power converter detects when at least one of an upper power switch and a lower power switch of the converter transition to an off state during a dead-time transition interval between the upper power switch and the lower power switch. The method generates a first comparison signal, indicative of a voltage level at a phase node of the converter, in a dead-time adjustment circuit coupled to the converter. The method further detects a body diode conduction level of at least one of the upper and lower power switches in the off state using at least a second comparison signal generated in the dead-time adjustment circuit and adjusts the dead-time transition interval between the upper power switch and the lower power switch using at least one current source from the dead-time adjustment circuit to reduce the dead-time transition interval to a desired dead-time interval.

19 Claims, 5 Drawing Sheets

U.S. PATENT DOCUMENTS

| | | |
|---|---|---|
| 6,940,262 B2 | 9/2005 | Dequina et al. |
| 7,031,175 B2 * | 4/2006 | Dequina et al. ............. 363/127 |
| 7,098,640 B2 | 8/2006 | Brown |
| 7,161,332 B1 | 1/2007 | Kleine et al. |
| 7,508,175 B2 | 3/2009 | DeWitt et al. |
| 2004/0012346 A1 | 1/2004 | Green et al. |
| 2004/0041619 A1 | 3/2004 | Nadd |
| 2005/0128776 A1 | 6/2005 | Dequina et al. |
| 2005/0184714 A1 | 8/2005 | Rusu et al. |
| 2006/0017421 A1 | 1/2006 | Solie et al. |
| 2007/0069236 A1 | 3/2007 | Capodivacca et al. |

OTHER PUBLICATIONS

"Synchronous Rectified MOSFET Driver (ISL6605)", "http://www.intersil.com/data/fn/fn9091.pdf", May 6, 2007, pp. 1-9, Publisher: Intersil Americas Inc.

Mappus, "Predictive Gate Drive Boosts Synchronous DC/DC Power Converter Efficiency", "Application Report- SLUA281", Apr. 2003, pp. 1-26, Publisher: Texax Instruments Inc.

"SI9150 Synchronous Buck Converter Controller", "Objective Specification", Sep. 10, 1991, Publisher: Siliconix Inc.

"Si9150 Power Products", "Datasheet", , Publisher: Siliconix Inc.

International Searching Authority, "International Search Report", Dec. 3, 2008, Published in: WO.

* cited by examiner

DEAD-TIME TRANSITION ADJUSTMENTS FOR SYNCHRONOUS POWER CONVERTERS

CROSS REFERENCE TO RELATED APPLICATIONS

This application is related to commonly assigned U.S. patent application Ser. No. 12/116,092, filed on May 6, 2008 and entitled "THRESHOLD VOLTAGE MONITORING AND CONTROL IN SYNCHRONOUS POWER CONVERTERS" (the '092 application). The '092 application is incorporated herein by reference in its entirety.

This application claims the benefit of priority to U.S. Provisional Patent Application Ser. Nos. 60/951,259 and 60/951,261, each filed on Jul. 23, 2007, the disclosures of which are each incorporated herein by reference in their entirety.

BACKGROUND

The most commonly used voltage regulator design comprises a synchronous-buck topology. In conventional synchronous-buck power converters, an input voltage ($V_{IN}$) is stepped down to an operating voltage ($V_{OUT}$) for a microprocessor (or a similar variable load). The converter controls $V_{OUT}$ by controlling the duty cycle of two output power switches. Typically, the output power switches are Metal Oxide Semiconductor Field-Effect Transistors, or MOSFETs.

The conventional synchronous converter operates with a switching "dead-time" interval between the upper and lower power switches. This dead-time interval prevents short-circuiting of the input $V_{IN}$ if both the upper and lower power switches were to be turned on simultaneously. During the dead-time, the main inductor current flows via a body diode of at least one of the upper and the lower power switches, commonly known as body diode conduction. Body diode conduction leads to substantial power loss due to (1) a relatively high voltage drop across the P-N junction of the power switches (when compared with the MOSFET voltage drop) and (2) a "reverse recovery loss" associated with the stored charge. Accordingly, there is a need for improvements in dead-time transition adjustments for synchronous power converters.

SUMMARY

The following specification provides for dead-time transition adjustments for synchronous power converters. This summary is made by way of example and not by way of limitation. It is merely provided to aid the reader in understanding some aspects of at least one embodiment described in the following specification.

Particularly, in one embodiment, a method of operating a synchronous power converter is provided. The method detects when at least one of an upper power switch and a lower power switch of the synchronous power converter transition to an off state during a dead-time transition interval between the upper power switch and the lower power switch. The method generates a first comparison signal, indicative of a voltage level at a phase node of the converter, in a dead-time adjustment circuit coupled to the converter. The method further detects a body diode conduction level of at least one of the upper and lower power switches in the off state using at least a second comparison signal generated in the dead-time adjustment circuit. Based on the first and second comparison signals indicating a continuing body diode conduction level of at least one of the upper and lower power switches in the off state, the method adjusts the dead-time transition interval between the upper power switch and the lower power switch using at least one current source from the dead-time adjustment circuit to reduce the dead-time transition interval to a desired dead-time interval.

BRIEF DESCRIPTION OF THE DRAWINGS

These and other features, aspects, and advantages are better understood with regard to the following description, appended claims, and accompanying drawings where:

The various described features are drawn to emphasize features relevant to the embodiments disclosed. Like reference characters denote like elements throughout the figures and text of the specification.

DETAILED DESCRIPTION

Embodiments disclosed herein relate to dead-time transition adjustments for synchronous power converters and switching voltage regulation systems. At least one embodiment is described below with reference to one or more example applications for illustration. It is understood that numerous specific details, relationships, and methods are set forth to provide a fuller understanding of the embodiments disclosed. Similarly, the operation of well known components and processes has not been shown or described in detail below to avoid unnecessarily obscuring the details of the embodiments disclosed.

For example, at least one embodiment relates to methods of reducing switching transition errors for a pair of upper and lower double-diffused metal oxide semiconductor (DMOS) power switches in a synchronous power converter. In particular, a dead-time adjustment circuit substantially reduces conduction losses and improves system efficiency during operation of the synchronous power converter (for example, during a dead-time transition interval that occurs between turning OFF a first power switch and turning ON a second power switch). This dead-time transition interval between turning OFF the first power switch and turning ON the second power switch is generally due to signal propagation delays in the converter circuitry. In one embodiment, the dead-time adjustment circuit modifies a lower gate driver input signal for the lower power switch to achieve a desired dead-time transition interval. The dead-time adjustment circuit discussed herein further prevents a "shoot-through" current (that is, the short-circuiting of the input voltage if both the upper and lower power switches are turned on simultaneously) in one or more circuit board layouts for various power electronics applications that include synchronous power converters.

Figure 1:
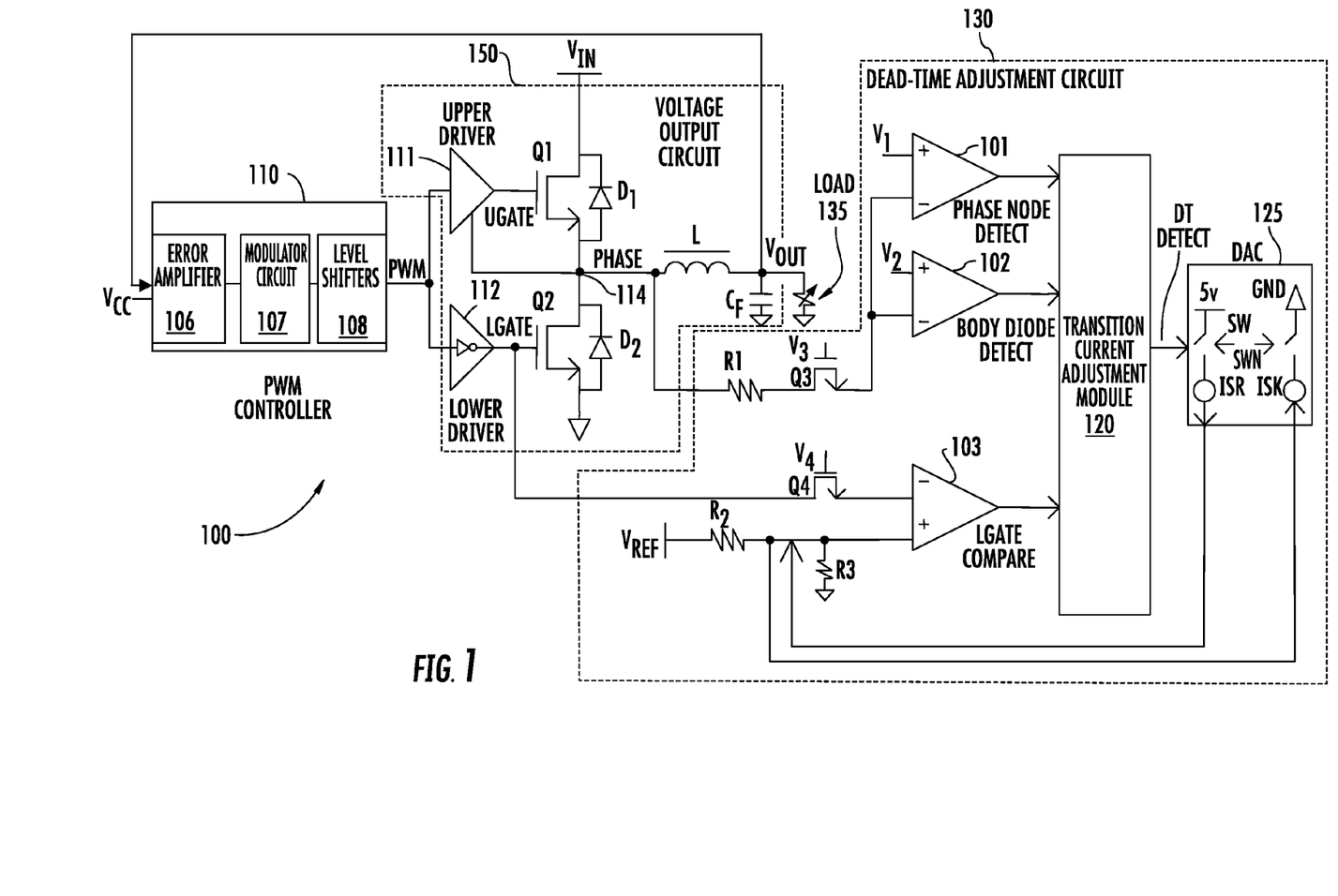
FIG. 1 is a block diagram in schematic form of an embodiment of a synchronous power converter having a dead-time adjustment circuit.

FIG. 1 is a block diagram in schematic form of an embodiment of a synchronous power converter 100 having a dead-time adjustment circuit 130. In the example embodiment of FIG. 1, the converter 100 further comprises a controller 110 and a voltage output circuit 150. In one implementation, the controller 110 is a multi-phase buck pulse width modulator (PWM) controller. In addition, although the converter 100 is shown as a single phase voltage regulation system, the converter 100 of FIG. 1 can be used with multi-phase systems, whether coupled or uncoupled, such as by employing an additional dead-time adjustment circuit 130 per phase. The voltage output circuit 150 comprises at least upper and lower gate drivers 111 and 112, and upper and lower output power switches Q1 and Q2. The circuit 150 further comprises a PHASE node 114, which is at a source of the switch Q1 and a drain of the switch Q2.

As shown in FIG. 1, the PWM controller 110 provides a driver control signal (PWM), which in turn drives the upper and lower gate drivers 111 and 112. The upper and lower gate drivers 111 and 112 use the driver control signal PWM to drive relatively high currents into the upper and lower gates of the upper and lower output power switches Q1 and Q2, respectively. These current driver signals are indicated in FIG. 1 as UGATE and LGATE, respectively. As further shown in FIG. 1, the switches Q1 and Q2 comprise body diodes D1 and D2, respectively.

The controller 110, not shown in any particular detail, is well known in the art and comprises an error amplifier 106, a modulator circuit 107, and one or more level shifters 108. For example, a power supply input voltage $V_{CC}$ is applied to a first input of the error amplifier 106 with a feedback signal from $V_{OUT}$ coupled to a second input of the error amplifier 106. The output of the error amplifier 106 drives the PWM portion of the modulator circuit 107. The one or more level shifters 108 translate the resulting desired pulse widths into signal levels suitable for the upper and lower gate drivers 111 and 112 of the voltage output circuit 150, respectively.

The converter 100 provides a desired voltage output for the voltage output circuit 150 at the PHASE node 114. During operation of the converter 100 (as discussed in further detail below), the output of the PHASE node 114 switches between levels approaching $V_{IN}$ (when the switch Q1 is on) and ground, or 0V (when the switch Q2 is on). In one implementation, a connection from the upper gate driver 112 to the PHASE node 114 is used by the upper gate driver 112 to connect the gate of the switch Q1 with the PHASE node 114 when the switch Q1 is turned off. The voltage output at the PHASE node 114 passes through a low pass filter circuit portion of the circuit 150 comprising an inductor L in series with a capacitor $C_F$ to become $V_{OUT}$ across a variable load 135. In one embodiment, the variable load 135 is a microprocessor, or the like.

In the example embodiment of FIG. 1, the dead-time adjustment circuit 130 comprises comparators 101, 102, and 103, communicatively coupled to a transition current adjustment module 120 and a digital to analog converter (DAC) 125. In one implementation, the transition current adjustment module 120 comprises combinational logic to control at least one transition current level from the DAC 125 using a dead-time transition adjustment signal (shown in FIG. 1 as DT DETECT) from the transition current adjustment module 120. The at least one transition current level is suitable for use in adjusting the turn-off of the switch Q2 via the LGATE driver signal from the lower gate driver 112. As discussed in further detail below, the LGATE driver signal is modified for the switch Q2 based on an adjustment in the at least one transition current level.

The comparators 101 and 102 are coupled to the PHASE node 114 via a low power load resistor R1 and a switch Q3 (shown as a NMOS transistor in the example embodiment of FIG. 1). In one implementation, the circuitry provided by the low power load resistor R1 and the switch Q3 function to isolate at least one high voltage phase (typically at 12 V) entering the dead-time adjustment circuit 130 to a lower voltage value (for example, 5 V). As shown in FIG. 1, the circuit 130 receives the LGATE driver signal at a first input of the comparator 103, with an offset switch Q4 (shown as a NMOS transistor in FIG. 1) further coupled to the first input of the comparator 103. In addition, the circuit 130 receives a reference voltage $V_{REF}$ (for example, 5 V) at a second (positive) input of the comparator 103 through a lower gate offset resistor R2 and a grounding resistor R3. The offset switch Q4 functions to modify the LGATE driver signal from the lower gate driver 112 based on the at least one transition current level provided to the positive input of the comparator 103, as discussed in further detail below.

In the example embodiment of FIG. 1, the DAC 125 is a seven-bit DAC (for example, the DAC 125 provides at least 128 stepped current levels). It is understood that in alternate implementations of the dead-time adjustment circuit 130, the DAC 125 is capable of providing other levels of resolution (for example, one to N bits of resolution). As shown in FIG. 1, the DAC 125 provides at least one of a source (ISR) and a sink (ISK) current. The transition current adjustment module 120 generates the DT DETECT signal for the DAC 125 based on comparative outputs provided by the comparators 101 to 103, as discussed in further detail below. In one embodiment, the DAC 125 comprises a first switch (SW) configured to activate the current source ISR with a power source (for example, a 5 V power source). The DAC 125 further comprises a second switch (SWN) configured to connect the current sink ISK with a GND connection. The first and second switches are controlled in the DAC 125 based on the DT DETECT signal level, as discussed in further detail below.

In operation, the dead-time adjustment circuit 130 limits the conduction of the body diode D2 of the switch Q2 to reduce a dead-time transition interval for the converter 100. In particular, the transition current adjustment module 120 instructs the DAC 125 to adjust the at least one transition current level that controls the conduction of the body diode D2. As discussed in further detail below, the combinational logic of the transition current adjustment module 120 monitors and controls a dead-time transition adjustment process to substantially reduce the dead-time transition interval between a turn-on of the switch Q1 following a turn-off of the switch Q2.

The comparator 101, shown as "PHASE NODE DETECT" in FIG. 1, is a phase voltage comparator that detects the voltage level at the PHASE node 114 for the transition current adjustment module 120. The phase voltage comparator 101 compares the voltage level at the PHASE node 114 against a first fixed voltage $V_1$ (for example, 0.8 V). When the voltage level at the PHASE node 114 reaches the first fixed voltage $V_1$, the body diode D2 is no longer conducting, and the output of the phase voltage comparator 101 indicates to the transition current adjustment module 120 to terminate sensing of the body diode D2. As a result, the transition current adjustment module 120 suspends any further adjustments of the at least one transition current level.

The comparator 102, shown as "BODY DIODE DETECT" in FIG. 1, is a body diode comparator that functions as a body diode detector for the transition current adjustment module 120. The output of the body diode comparator 102 serves as a conduction detection signal for the body diode D2 of the switch Q2. In one implementation, to detect the body diode conduction level of the body diode D2, the body diode comparator 102 compares the voltage level at the PHASE node 114 with a fixed voltage level $V_2$ (for example, −0.3 V). When the body diode D2 is ON, the voltage level at the PHASE node 114 is generally less than −0.5 volts, which forces the output of the body diode comparator 102 HIGH. As a result, the body diode comparator 102 provides an indication to the transition current adjustment module 120 to continue adjustment of the at least one transition current level.

The comparator 103, shown as "LGATE COMPARE" in FIG. 1, functions as a lower gate comparator for the transition current adjustment module 120. The lower gate comparator 103 is a high-speed latch comparator that compares the voltage level at the gate of the switch Q2 to the reference voltage $V_{REF}$ as an indication to the transition current adjustment module 120 of the present state of the switch Q2.

In the dead-time transition adjustment process provided by the dead-time adjustment circuit 130, the DAC 125 increments the at least one transition current level using the current source ISR for every PWM operating cycle of the PWM controller 110. In particular, the DAC 125 increments the at least one transition current level at the positive input of the lower gate comparator 103 based on the DT DETECT signal from the transition current adjustment module 120. The lower gate comparator 103 equalizes a negative input to the positive input based on the source current ISR at the positive input of the lower gate comparator 103. As a result, the lower gate comparator 103 adjusts the LGATE driver signal for the switch Q2 through the negative input of the lower gate comparator 103. In this example, the modified LGATE driver signal turns off the switch Q2. This dead-time transition adjustment process continues (for example, in increasing current steps per PWM-defined operating cycle) as long as the body diode comparator 102 continues to detect the body diode D2 conducting. As soon as the body diode D2 stops conducting, the output from the body diode comparator 102 goes LOW. In turn, the transition current adjustment module 120 transitions the DT DETECT signal low, informing the DAC 125 to stop incrementing the source current ISR.

Similarly, on a subsequent PWM cycle following the deactivation of the body diode D2, the DAC 125 enables the current sink ISK. The current sink ISK will decrease the positive input level for the lower gate comparator 103. As a result, a similar equalizing of the positive and negative inputs to the lower gate comparator 103 occurs, the LGATE driver input signal for the switch Q2 increases to (re-)activate the body diode D2, and the body diode comparator 102 will again detect the body diode conduction of the switch Q2.

In the example embodiment of FIG. 1, a desired dead-time transition adjustment results in an alternating ON/OFF of both the current source ISR and the current sink ISK for successive PWM cycles. As a result, the circuit 130 performs dead-time adjustment in both directions (for example, either increasing or decreasing), depending on the characteristics of at least the body diode D2 of the switch Q2. If there is no body diode conduction detected during at least the first dead-time transition adjustment, the current sink ISK adjusts the positive input of the lower gate comparator 103. As discussed above, the lower gate comparator 103 modifies the LGATE signal input for the switch Q2 until the body diode comparator 102 detects the conduction level of the body diode D2.

The dead-time adjustment circuit 130 reduces conduction losses and improves system efficiency by controllably limiting the conduction of the body diode D2 and reducing the dead-time transition interval for turning ON the switch Q1 after turning the switch Q2 OFF. In at least one embodiment, the dead-time adjustment circuit 130 turns ON the switch Q1 following a turn OFF of the switch Q2 using the dead-time transition adjustment process discussed above. Through control of the dead-time transition interval with the combinational logic of the transition current adjustment module 120, the dead-time adjustment circuit 130 provides a desired dead-time interval that reduces a switching delay time between the switches Q1 and Q2 and increases system efficiency.

Figure 2:
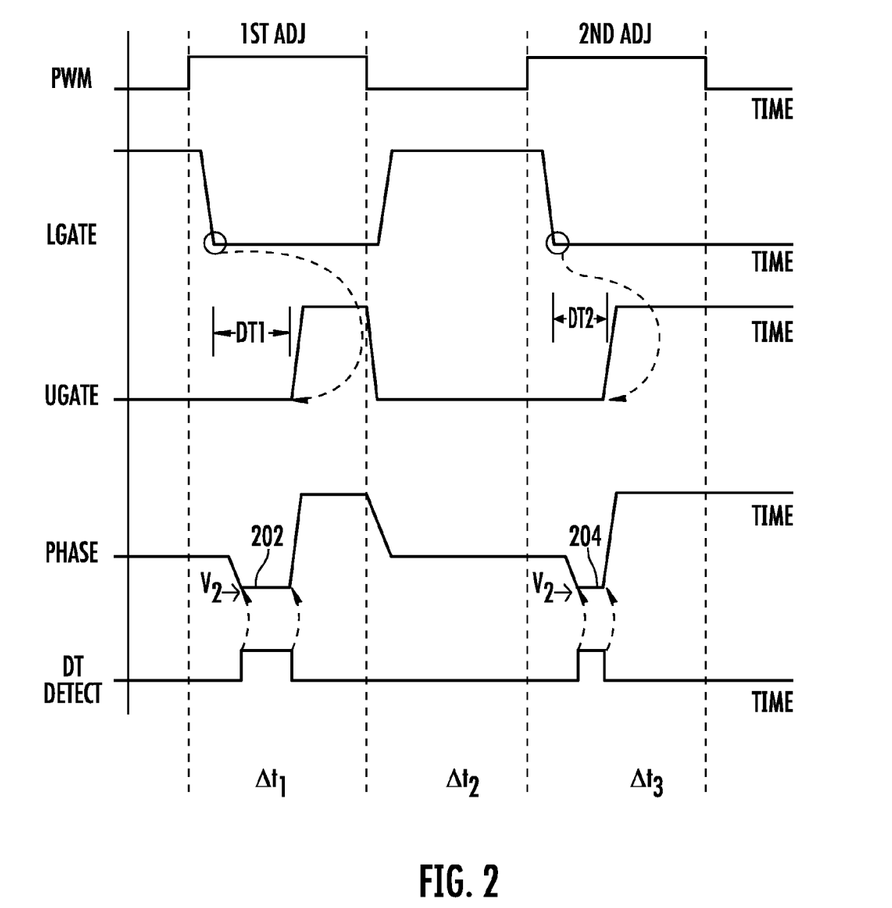
FIG. 2 provides a number of timing diagrams of signal levels of various nodes for at least two operating cycles of an embodiment of a synchronous power converter having a dead-time adjustment circuit.
Figure 3:
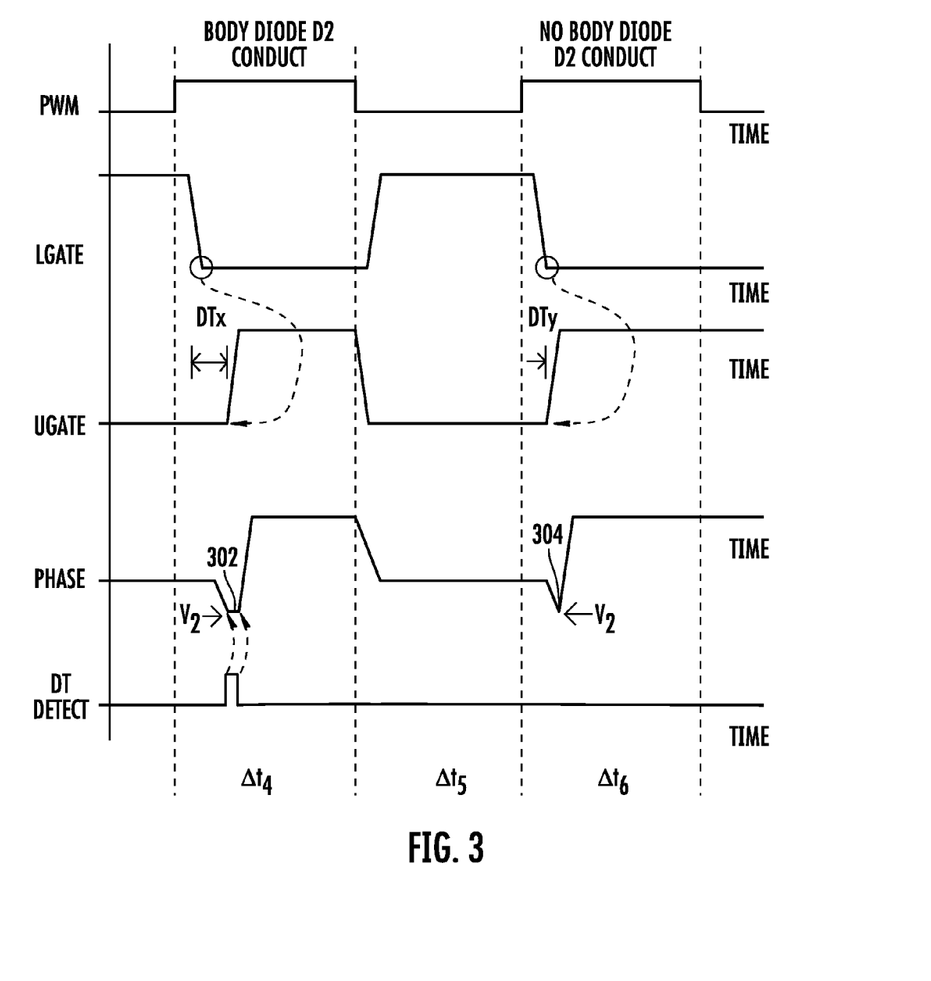
FIG. 3 provides a number of timing diagrams of the dead-time adjustments for the signal levels of the various nodes following the at least two operating cycles of the synchronous power converter of FIG. 2.

The simulated timing of a process performed by the dead-time adjustment circuit 130 for a single-phase synchronous power converter 100 is described below with respect to FIGS. 2 and 3. It is understood that the example embodiments described below with respect to FIGS. 2 and 3 are provided for illustrative purposes only and do not in any way define or limit the scope of the embodiments disclosed. For example, one or more of the disclosed embodiments can be applied to a variety of voltage regulators and power converters, including multi-phase converters, single channel MOSFET drivers, and integrated driver controllers.

FIG. 2 provides a number of timing diagrams of signal levels of various nodes for at least two operating cycles of the dead-time adjustment circuit 130 of FIG. 1. The timing diagrams of FIG. 2 are illustrative examples of operating the converter 100 when turning ON an upper gate (UGATE) driver of the switch Q1 after turning OFF a lower gate (LGATE) driver of the switch Q2. For purposes of illustration, the operating cycles shown in FIG. 2 represent PWM operating cycle periods $\Delta t_1$ to $\Delta t_3$.

As shown in FIG. 2, from the cycle period $\Delta t_1$ to the cycle period $\Delta t_3$, the LGATE driver signal for the switch Q2 and the UGATE driver signal for the switch Q1 indicate that a dead-time interval after a second adjustment (DT2) is less than a corresponding dead-time interval after a first adjustment (DT1). In addition, a voltage level at the PHASE node 114 of FIG. 1 does not decrease below the voltage level $V_2$ while the body diode D2 continues to conduct after turning OFF the LGATE driver of the switch Q2. The DT DETECT signal remains HIGH as the voltage level at the PHASE node 114 remains below zero levels 202 and 204 while the LGATE driver is turned off and before the UGATE driver is turned on. During the DT1 and DT2 periods, the transition current adjustment module 120 issues the DT DETECT signal to adjust at least one transition current level (for example, at least one of the current source ISR and the current sink ISK) to reduce the dead-time transition interval. For example, the DAC 125 of FIG. 1 incrementally increases the current source ISR until the body diode D2 turns OFF to achieve a desired dead-time transition interval, as discussed below with respect to the PWM operating cycles of FIG. 3.

FIG. 3 provides a number of timing diagrams of the dead-time adjustments for the signal levels of the various nodes following the at least two operating cycles of the synchronous power converter 100 shown in FIG. 2. For purposes of illustration, the operating cycles are shown in FIG. 3 represent PWM operating cycle periods $\Delta t_4$ to $\Delta t_6$. As shown in FIG. 3, for the cycle periods $\Delta t_4$ to $\Delta t_6$, a PWM signal from the controller 110 indicates a dead-time transition for the converter 100 after completion of the dead-time adjustment process of the circuit 130 discussed above with respect to FIG. 2. The dead-time transition intervals shown for the cycle periods $\Delta t_4$ to $\Delta t_6$ provides a desired dead-time for the body diode D2 of the converter 100.

In the example embodiment of FIG. 3, a first dead-time interval for turning ON the UGATE driver of the switch Q1 after turning OFF the LGATE driver for the switch Q2 when the body diode D2 begins conducting is shown as DTx during the cycle period $\Delta t_4$. Moreover, a DT DETECT signal remains HIGH as a voltage level at the PHASE node 114 of FIG. 1 remains below a zero level 302 during the time DTx. In one embodiment, after reaching a desired point of adjustment, the DT DETECT signal shown in FIG. 3 is issued by the transition current adjustment module 120 of FIG. 1 to alternate the source current ISR and the sink current ISK provided by the DAC 125. Preferably, the transition current adjustment module 120 alternates the current source ISR and the current sink ISK for successive PWM cycles, resulting in the body diode D2 turning ON and OFF in consecutive PWM cycles. As an example, in cycle period $\Delta t_6$, when the body diode D2 is no longer conducting, a second dead-time for the body diode D2 starting to turn OFF is shown as DTy. The time for the voltage level at the PHASE node 114 below a zero level 304 during the time DTy is substantially less with respect to the previous cycle period $\Delta t_4$.

Figure 4:
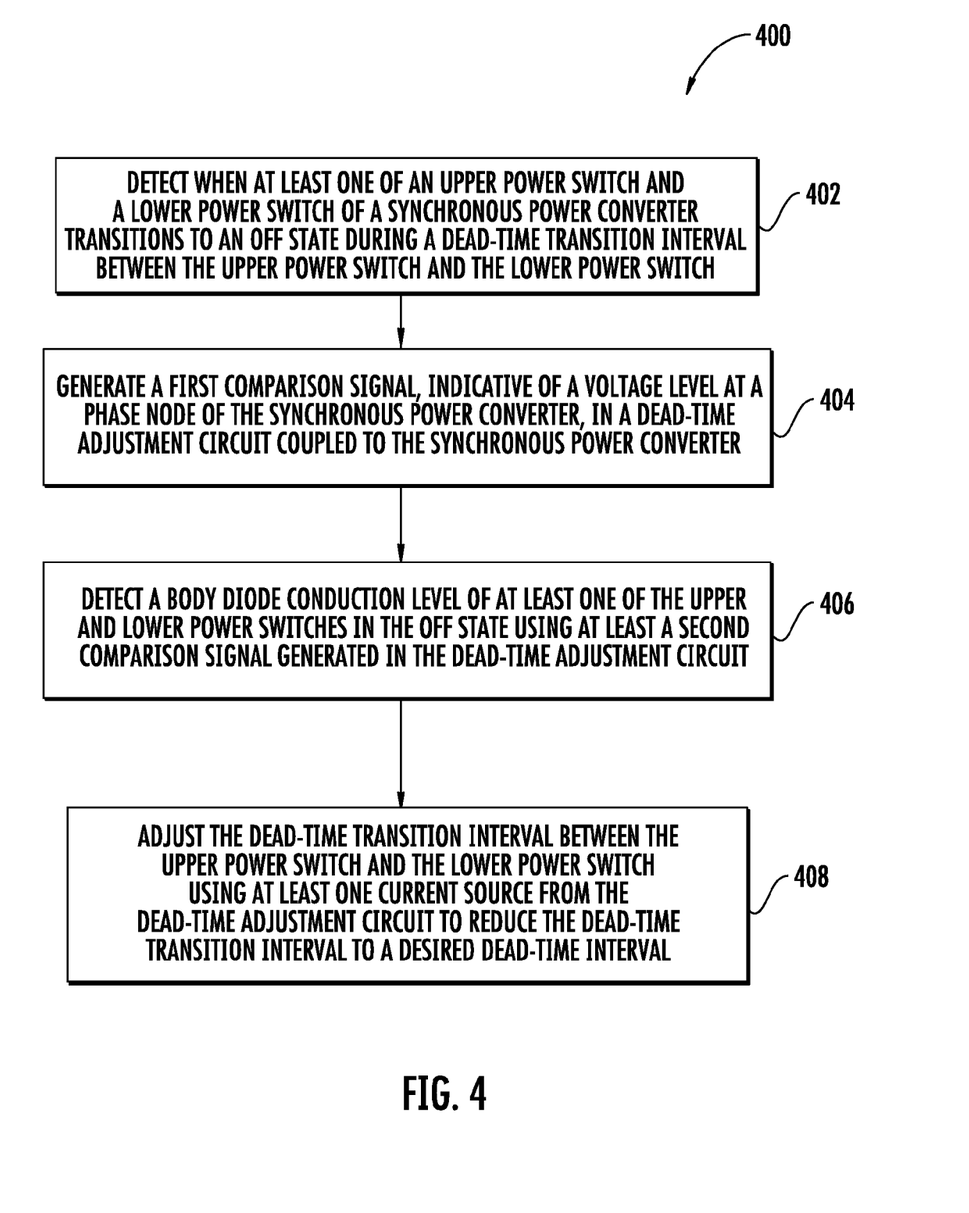
FIG. 4 is a flow diagram of an embodiment of a method for operating a synchronous power converter.

FIG. 4 is a flow diagram of an embodiment of a method 400 of operating a synchronous power converter. The method of FIG. 4 functions to substantially reduce switching transition errors for the upper and lower power switches. In particular, the method 400 provides a dead-time adjustment circuit to substantially reduce body diode conduction losses for the synchronous power converter and increase system efficiency. In one implementation, the dead-time adjustment circuit controls body diode conduction for at least the lower power switch based on a dead-time transition interval present when switching between the upper and lower power switches of the synchronous power converter. For example, the method 400 addresses limiting the conduction of at least one body diode of one of the upper and lower power switches of the synchronous power converter by turning on the upper power switch right after the turn off of the lower power switch at a desired dead-time transition interval.

The method 400 detects when at least one of the upper power switch and the lower power switch of the synchronous power converter transitions to an off state during a dead-time transition interval between the upper power switch and the lower power switch at block 402. The dead-time adjustment circuit generates a first comparison signal indicative of a voltage level at a phase node of the synchronous power converter at block 404. In one implementation, the dead-time adjustment circuit determines when to suspend the dead-time adjustment of the method shown in FIG. 4 based on the voltage level at the phase node reaching a predetermined detection voltage level. In one embodiment, the predetermined detection voltage level is indicative of a near zero body diode conduction level for at least one of the upper and lower power switches in the off state.

At block 406, the dead-time adjustment circuit detects a body diode conduction level of at least one of the upper and lower power switches in the off state using at least a second comparison signal generated in the dead-time adjustment circuit. At block 408, based on the first and second comparison signals indicating a continuing body diode conduction level of at least one of the upper and lower power switches in the off state, the dead-time adjustment circuit adjusts the dead-time transition interval between the upper power switch and the lower power switch using at least one current source to reduce the dead-time transition interval to a desired dead-time interval. In one embodiment, the dead-time adjustment circuit incrementally increases a current level from the at least one current source for every operating cycle of the synchronous power converter that a body diode comparator of the dead-time adjustment circuit detects the body diode conduction of at least one of the upper and lower power switches. The dead-time adjustment circuit modifies a driver input signal for the lower power switch with the at least one current source to control the body diode conduction level of the lower power switch.

In one implementation, the dead-time adjustment circuit provides alternating source and sink current sources as the at least one current source for successive operating cycles of the synchronous power converter based on the continued body diode conduction level of at least one of the upper and lower power switches. In a similar implementation, during at least a first dead-time transition interval adjustment, the dead-time adjustment circuit adjusts a positive input level for a lower gate comparator of the dead-time adjustment circuit until the body diode comparator of the dead-time adjustment circuit detects the body diode conduction level of the lower power switch.

Figure 5:
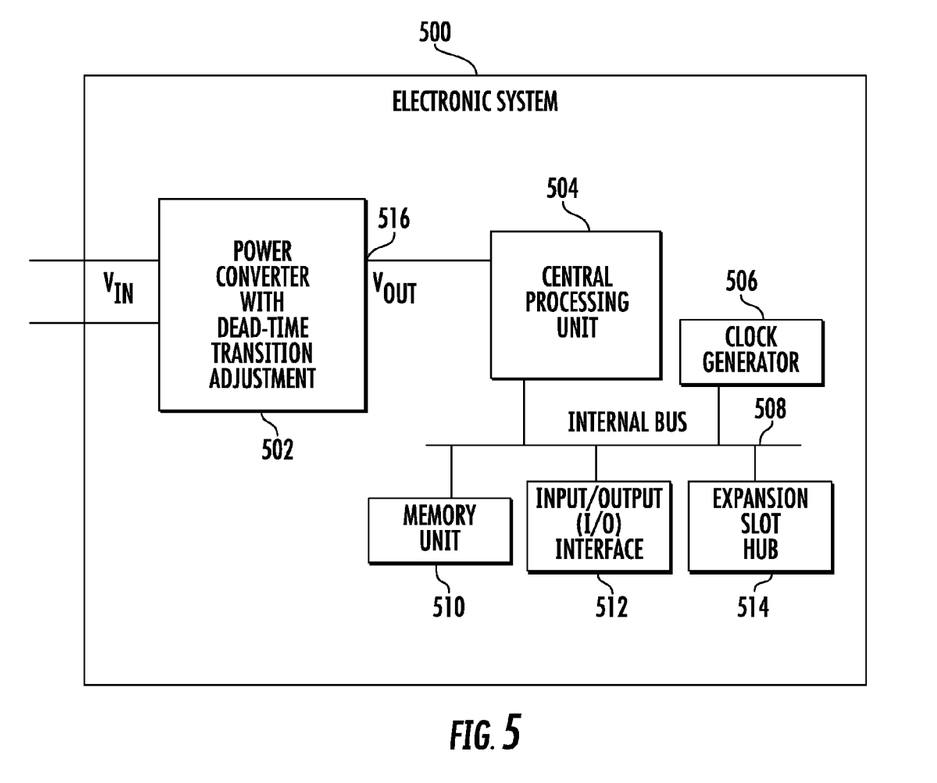
FIG. 5 is a block diagram of an exemplary embodiment of an electronic device having a synchronous power converter with dead-time transition adjustment.

FIG. 5 is a block diagram of an exemplary embodiment of an electronic system, indicated generally at 500, having a synchronous power converter with dead-time transition adjustment 502 similar to the synchronous power converter 100 of FIG. 1. The synchronous power converter 502 is coupled to a central processing unit 504. Examples of the central processing unit 504 include any type of microprocessor or microcontroller such as but not limited to, computer motherboards, systems, and displays operating with variable loads. The electronic system 500 further comprises a clock generator 506, a memory unit 510, an input/output (I/O) interface (512), and an expansion slot hub 514, each of which are communicatively coupled to the central processing unit 504 via an internal bus 508.

As illustrated, the synchronous power converter 502 takes a voltage input $V_{IN}$ and provides a voltage output $V_{OUT}$ to the central processing unit 504 at an output node 516. In particular, the synchronous power converter 502 operates under various implementations and load conditions of the microprocessor 504. In the exemplary embodiment of FIG. 5, the dead-time transition adjustment in the power converter 502 substantially reduces switching transition errors for the upper and lower power switches of the power converter 502 using at least one current source provided for successive operating cycles of the synchronous power converter 502.

This description has been presented for purposes of illustration, and is not intended to be exhaustive or limited to the embodiments disclosed. For example, at least one embodiment is implemented using either digital or analog circuitry, or a combination of both, and, where appropriate, realized through software executing on suitable processing circuitry and machine-readable storage mediums. The embodiments disclosed are suitable for use in a variety of circuits, including power MOSFET drivers and integrated driver/output switches, as well as related voltage regulation systems, including computing and switching mode power supply systems. Variations and modifications may occur, which fall within the scope of the following claims.

What is claimed is:

1. A method of operating a synchronous power converter, the method comprising:
   detecting when at least one of an upper power switch and a lower power switch of a synchronous power converter transitions to an off state during a dead-time transition interval between the upper power switch and the lower power switch;
   generating a first comparison signal in a dead-time adjustment circuit coupled to the synchronous power converter, the first comparison signal indicative of a voltage level at a phase node of the synchronous power converter;
   detecting a body diode conduction level of at least one of the upper and lower power switches in the off state using at least a second comparison signal generated in the dead-time adjustment circuit; and based on the first and second comparison signals indicating a continuing body diode conduction level of at least one of the upper and lower power switches in the off state, adjusting the dead-time transition interval between the upper power switch and the lower power switch using at least one current source from the dead-time adjustment circuit to reduce the dead-time transition interval to a desired dead-time interval.

2. The method of claim 1, further comprising:
adjusting a driver input signal for the lower power switch with the dead-time adjustment circuit to control the body diode conduction level of the lower power switch.

3. The method of claim 1, wherein generating the first comparison signal further comprises:
determining when the voltage level at the phase node is at a predetermined detection voltage level such that adjustment of the dead-time transition interval is suspended, the predetermined detection voltage level indicative of a near zero body diode conduction level for at least one of the upper and lower power switches in the off state.

4. The method of claim 1, wherein adjusting the dead-time transition interval comprises providing alternating source and sink currents as the at least one current source for successive operating cycles of the synchronous power converter based on a continuing body diode conduction level of at least one of the upper and lower power switches.

5. The method of claim 4, wherein providing the alternating source and sink currents comprises, during at least a first dead-time transition interval adjustment, adjusting a positive input level for a lower gate comparator of the dead-time adjustment circuit until the dead-time adjustment circuit detects the body diode conduction of the lower power switch.

6. The method of claim 1, wherein adjusting the dead-time transition interval comprises incrementally increasing a current level from the at least one current source for every operating cycle of the synchronous power converter until a body diode comparator of the dead-time adjustment circuit no longer detects the body diode conduction level of at least one of the upper and lower power switches.

7. A dead-time adjustment circuit for a synchronous power converter, comprising:
a first comparator having a first input coupled to a phase node between upper and lower power switches of a synchronous power converter and a second input operable to receive a first voltage level associated with detecting a body diode conduction level of at least one of the upper and lower power switches, the first comparator operable to monitor a voltage level at the phase node that corresponds with the body diode conduction level for at least one of the upper and lower power switches;
a second comparator having a first input for receiving a reference voltage, the second comparator responsive to at least one transition current level and a second input operable to receive an output signal from a lower gate driver of the lower power switch;
a transition current adjustment module, coupled to the first comparator and the second comparator, the transition current adjustment module operable to control the at least one transition current level based on output signals from the first comparator and the second comparator; and
wherein the transition current adjustment module adjusts a dead-time transition interval between the upper power switch and the lower power switch using at least one current source in the dead-time adjustment circuit to reduce the dead-time transition interval to a desired dead-time interval in response to an indication from the output signals of the first comparator and the second comparator of a continuing body diode conduction level for at least one of the upper and lower power switches.

8. The circuit of claim 7, further comprising:
a digital to analog converter operable to receive a dead-time transition adjustment signal from the transition current adjustment module.

9. The circuit of claim 8, wherein the dead-time transition adjustment signal instructs the digital to analog converter to incrementally adjust the at least one transition current level for every operating cycle of the synchronous power converter as long as the first comparator continues to detect the body diode conduction level for at least one of the upper and lower power switches.

10. The circuit of claim 8, wherein the digital to analog converter provides the at least one current source as at least one of a source current and a sink current.

11. The circuit of claim 7, further comprising:
a third comparator operable to provide an output to the transition current adjustment module, the third comparator having a first input coupled to receive a second voltage level and a second input coupled to receive the phase node voltage level, the output of the third comparator operable to indicate to the transition current adjustment module to terminate sensing of the body diode conduction level of at least one of the upper and lower power switches when the voltage level at the phase node reaches the second voltage level.

12. A voltage regulation system, comprising:
a voltage output circuit having upper and lower power switches, the voltage output circuit operable to provide a voltage output at a phase node coupled between the upper and lower power switches;
a dead-time adjustment circuit coupled to the voltage output circuit, the dead-time adjustment circuit including,
a first comparator having a first input coupled to a phase node between the upper and lower power switches and a second input operable to receive a first voltage level associated with detecting a body diode conduction level of at least one of the upper and lower power switches,
a second comparator having a first input for receiving a reference voltage, the second comparator responsive to at least one transition current level and a second input operable to receive a lower gate driver output signal provided by a lower gate driver of the lower power switch, and
a transition current adjustment module operable to receive an output of the second comparator, the transition current adjustment module operable to control the at least one transition current level for the lower power switch; and
a controller operable to provide a control input to the voltage output circuit based at least in part on a feedback signal from the voltage output circuit;
wherein the transition current adjustment module provides a dead-time transition adjustment for the second comparator based on an indication from the first comparator of the body diode conduction level of the lower power switch in an off-state by adjusting a dead-time transition interval between the upper and lower power switches using at least one current source to reduce the dead-time transition interval to a desired dead-time interval.

13. The system of claim 12, wherein the voltage output circuit comprises a low pass filter having an output node, wherein the output node of the low pass filter provides a voltage feedback signal to the controller.

14. The system of claim 12, wherein the dead-time adjustment circuit is further operable to adjust the dead-time transition interval using the at least one current source for each operating cycle of the synchronous power converter as long as the first comparator of the dead-time adjustment circuit continues to detect the body diode conduction level for the lower power switch.

15. The system of claim 14, wherein the second comparator compares the voltage level of the lower gate driver output against the reference voltage as the first comparator continues to detect the body conduction level of the lower power switch.

16. The system of claim 12, wherein the dead-time adjustment circuit further comprises:

a third comparator operable to provide an output to the transition current adjustment module, the third comparator having a first input coupled to receive a signal representative of a first fixed voltage level and a second input coupled to receive the phase node voltage output.

17. The system of claim 16, wherein the output of the third comparator indicates to the transition current adjustment module to terminate sensing of the body diode of the lower power switch and suspend any further adjustments of the dead-time transition interval when the phase node voltage output reaches the first fixed voltage level.

18. An electronic system, comprising:

a varying load device having at least one power input; and a power converter having at least one output coupled to the at least one power input of the varying load device, the power converter including, a dead-time adjustment circuit coupled to the power converter, the dead-time adjustment circuit configured to correct a dead-time transition interval for upper and lower power switches of the power converter based on detecting a body diode conduction level of at least one of the upper power switch and the lower power switch after the lower power switch is turned off, wherein the dead-time adjustment circuit adjusts the dead-time transition interval for the upper and lower power switches by adjusting the dead-time transition interval between the upper and lower power switches to a desired dead-time interval using at least one current source in the dead-time adjustment circuit, the at least one current source provided for successive operating cycles of the synchronous power converter in response to the body diode conduction level.

19. The system of claim 18, wherein the varying load device is a central processing unit.

\* \* \* \* \*